US012561399B2

(12) United States Patent　(10) Patent No.:　US 12,561,399 B2
Yokoi et al.　(45) Date of Patent:　Feb. 24, 2026

(54) COMPUTER SYSTEM AND DATA ANALYSIS METHOD

(71) Applicant: Hitachi, Ltd., Tokyo (JP)

(72) Inventors: Naoaki Yokoi, Tokyo (JP); Masashi Egi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 820 days.

(21) Appl. No.: 17/950,951

(22) Filed: Sep. 22, 2022

(65) Prior Publication Data

US 2023/0161841 A1　May 25, 2023

(30) Foreign Application Priority Data

Nov. 25, 2021　(JP) ................................. 2021-191403

(51) Int. Cl.
　*G06F 18/21*　(2023.01)
　*G06F 18/2413*　(2023.01)
(52) U.S. Cl.
　CPC ........ *G06F 18/217* (2023.01); *G06F 18/2413* (2023.01)
(58) Field of Classification Search
　CPC ..... G06F 18/217; G06F 18/2413; G06N 5/01; G06N 20/20
　See application file for complete search history.

(56) References Cited

U.S. PATENT DOCUMENTS

| 12,056,771 | B1 * | 8/2024 | Contryman | ............ | G06Q 40/08 |
| 2020/0211716 | A1 * | 7/2020 | Lefkofsky | ............. | G06F 18/214 |
| 2021/0103829 | A1 * | 4/2021 | Barshan | ................. | G06N 20/10 |
| 2022/0277232 | A1 * | 9/2022 | Jones | ....................... | G06N 3/08 |

FOREIGN PATENT DOCUMENTS

JP　　　　2020-030738 A　　2/2020

OTHER PUBLICATIONS

Kohavi, R., "A study of cross-validation and bootstrap for accuracy estimation and model selection", International Joint Conference on Artificial Intelligence (IJCAI), vol. 14, No. 2, 1995.
Koh, P. et al., "Understanding Black-box Predictions via Influence Functions", International Conference on Machine Learning (ICML), 2017.

* cited by examiner

*Primary Examiner* — Barbara M Level
(74) *Attorney, Agent, or Firm* — Procopio, Cory, Hargreaves & Savitch LLP

(57)　　　　　ABSTRACT

A computer system is provided, which is capable of evaluating the degree of influence of training data on prediction accuracy of a decision tree type machine learning model, while suppressing increase in processing time thereof. A similarity score calculating unit uses a tree structure of a trained model of a target predictor to calculate, for each of training data used for learning this trained model, a similarity score in which is evaluated similarity between the training data in the trained model and other training data. An evaluating unit selects target data that is training data that is a target of evaluation from the training dataset on the basis of the similarity score, and calculates an influence score in which the degree of influence of the target data on accuracy of the trained model is evaluated.

14 Claims, 22 Drawing Sheets

| Training ID | Explanatory variables | | | | | Objective variable |
|---|---|---|---|---|---|---|
| | Water | Cement | ⋯ | Days | ⋯ | Strength |
| 1 | 162 | 540 | ⋯ | 28 | ⋯ | 79.9 |
| 2 | 228 | 332.5 | ⋯ | 270 | ⋯ | 40.3 |
| ⋮ | ⋮ | ⋮ | ⋮ | ⋮ | ⋮ | ⋮ |
| 10000 | 192 | 198.6 | ⋯ | 28 | ⋯ | 28.0 |

300 Training dataset

| Test ID | Explanatory variables | | | | | Objective variable |
|---|---|---|---|---|---|---|
| | Water | Cement | ⋯ | Days | ⋯ | Strength |
| 1 | 181.1 | 475 | ⋯ | 7 | ⋯ | 55.6 |
| 2 | 155.7 | 318.8 | ⋯ | 56 | ⋯ | 66.1 |
| ⋮ | ⋮ | ⋮ | ⋮ | ⋮ | ⋮ | ⋮ |
| 500 | 189.3 | 222.4 | ⋯ | 3 | ⋯ | 11.58 |

400 Test dataset

| Training ID | Similarity score |
|:---:|:---:|
| 1 | 31% |
| 2 | 0.05% |
| ⋮ | ⋮ |
| 10000 | 53% |

500 Similarity score data

| Training ID | Influence score |
|:-----------:|:---------------:|
| 2 | −2.11 |
| 7 | +0.56 |
| ⋮ | ⋮ |
| 2301 | −0.81 |

600 Influence score data

| Test ID | Prediction value |
|---------|------------------|
| 1 | 54.8 |
| 2 | 72.1 |
| ⋮ | ⋮ |
| 500 | 9.48 |

700 Prediction value data

710 Target predictor accuracy
evaluation results

FIG. 13

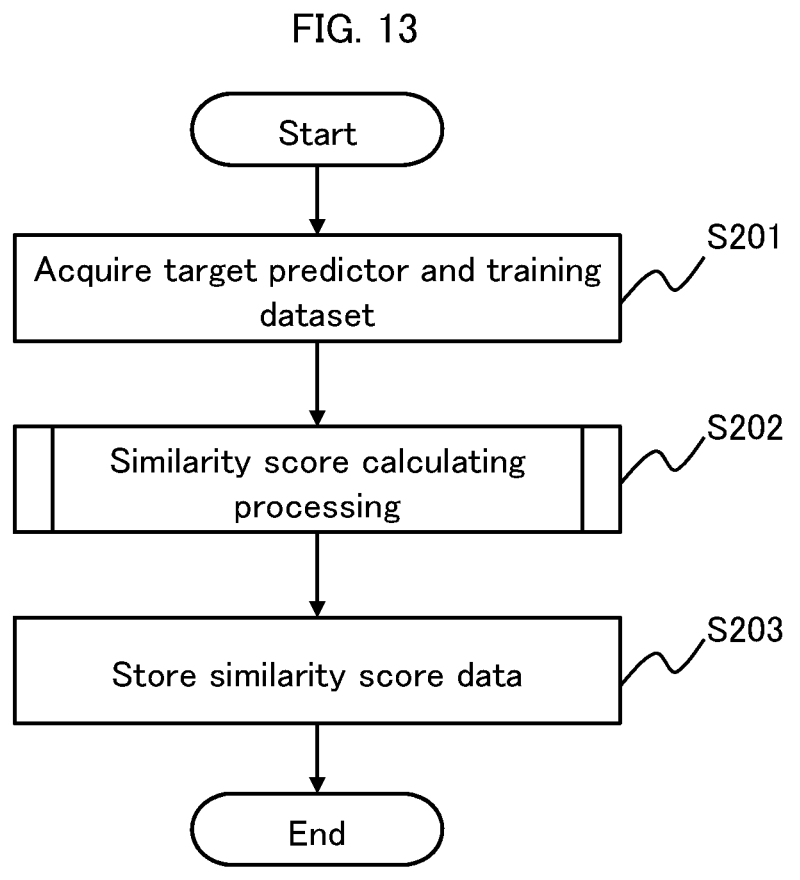

```
           ┌─────────────┐
           │    Start     │
           └─────────────┘
                  │
                  ▼
  ┌──────────────────────────────┐
  │ Acquire target predictor and  │ ─── S201
  │         training              │
  │         dataset               │
  └──────────────────────────────┘
                  │
                  ▼
  ┌─┬──────────────────────────┬─┐
  │ │ Similarity score calculating│ │ ─── S202
  │ │         processing          │ │
  └─┴──────────────────────────┴─┘
                  │
                  ▼
  ┌──────────────────────────────┐
  │   Store similarity score data │ ─── S203
  └──────────────────────────────┘
                  │
                  ▼
           ┌─────────────┐
           │     End      │
           └─────────────┘
```

FIG. 16

| Training ID | Arrival leaf node ID | | | |
|---|---|---|---|---|
| | Tree 1 | Tree 2 | ... | Tree 100 |
| 1 | Leaf 3 | Leaf 6 | ... | Leaf 2 |
| 2 | Leaf 3 | Leaf 13 | ... | Leaf 4 |
| ⋮ | ⋮ | ⋮ | ⋮ | ⋮ |
| 10000 | Leaf 1 | Leaf 10 | ... | Leaf 3 |

801    802    802    802

800 Arrival leaf node data

| Training ID | Leaf node arrival rate | | | |
|---|---|---|---|---|
| | Tree 1 | Tree 2 | ··· | Tree 100 |
| 1 | 0.5% | 12% | ··· | 20.2% |
| 2 | 0.5% | 0.2% | ··· | 0.3% |
| ⋮ | ⋮ | ⋮ | ⋮ | ⋮ |
| 10000 | 53% | 10% | ··· | 40% |

810 Arrival leaf node aggregation data

Figure 19:
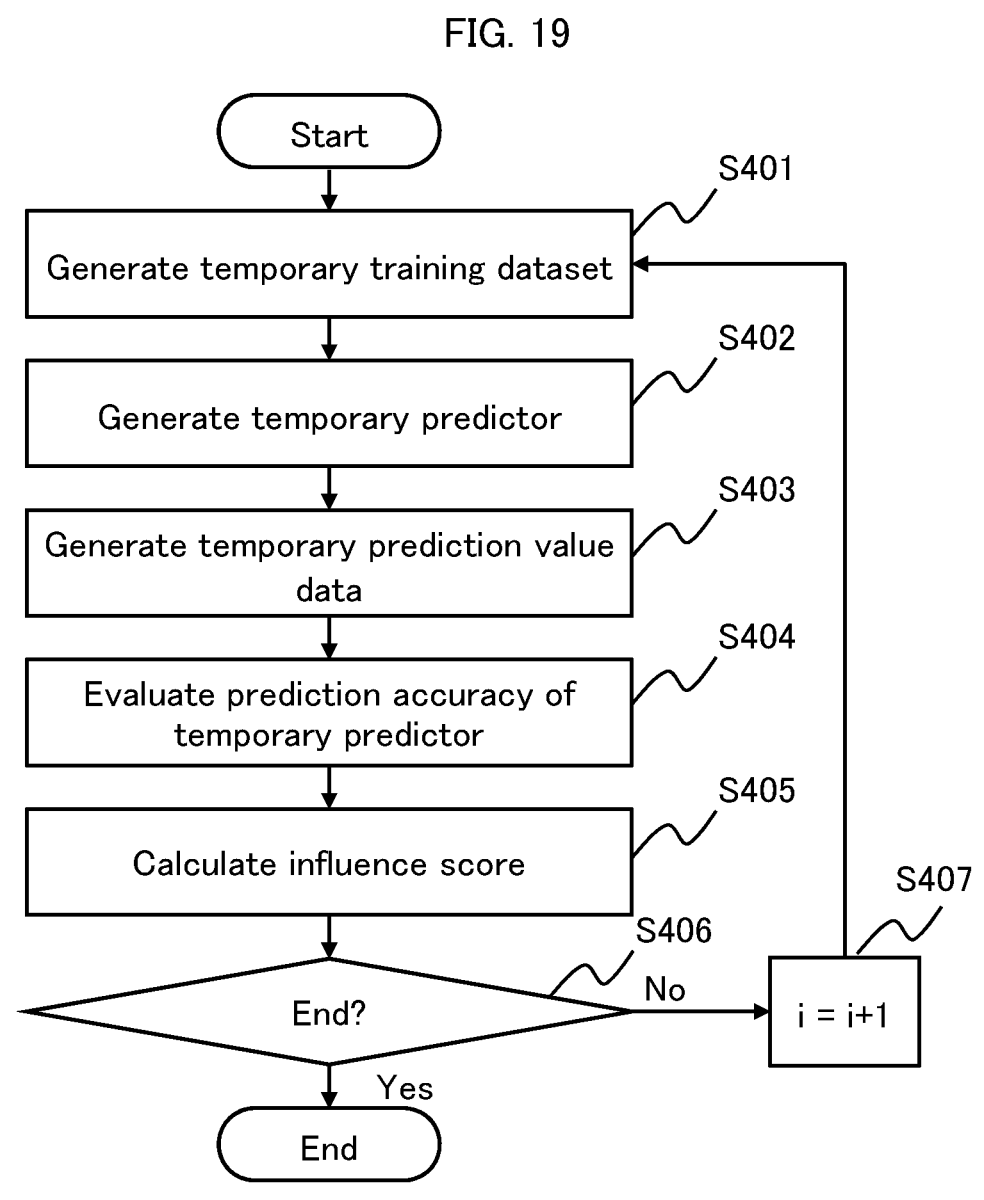

```
        ┌─────────┐
        │  Start  │
        └─────────┘
             │
             ▼
┌──────────────────────────────────┐   S401
│ Generate temporary training dataset │◄──────┐
└──────────────────────────────────┘         │
             │                                │
             ▼                                │
┌──────────────────────────────────┐   S402   │
│   Generate temporary predictor    │          │
└──────────────────────────────────┘          │
             │                                │
             ▼                                │
┌──────────────────────────────────┐   S403   │
│ Generate temporary prediction value│         │
│              data                 │          │
└──────────────────────────────────┘          │
             │                                │
             ▼                                │
┌──────────────────────────────────┐   S404   │
│    Evaluate prediction accuracy of │         │
│        temporary predictor        │          │
└──────────────────────────────────┘          │
             │                                │
             ▼                                │
┌──────────────────────────────────┐   S405   │
│      Calculate influence score    │          │
└──────────────────────────────────┘          │
             │                          S407   │
             ▼                  S406           │
          ◇─────────◇      No   ┌─────────┐   │
          ◇  End?   ◇──────────►│ i = i+1 │───┘
          ◇─────────◇           └─────────┘
             │ Yes
             ▼
        ┌─────────┐
        │   End   │
        └─────────┘
```

COMPUTER SYSTEM AND DATA ANALYSIS METHOD

CROSS-REFERENCE TO PRIOR APPLICATION

This application relates to and claims the benefit of priority from Japanese Patent Application No. 2021-191403 filed in Nov. 25, 2021 the entire disclosure of which is incorporated herein by reference.

BACKGROUND

The present disclosure relates to a computer system and a data analysis method.

Generally, in order to improve prediction accuracy by a machine learning model, increasing the count of training data used for learning by the machine learning model is thought to be effective. However, training data sometimes contains harmful data, which actually deteriorates the prediction accuracy of the machine learning model that has learned the same. Examples of harmful data include mislabeled data in which erroneous values are set to objective variables, outlier data indicating special situations with a low recall factor, and so forth.

Ron Kohavi, "A study of cross-validation and bootstrap for accuracy estimation and model selection", International Joint Conference on Artificial Intelligence (IJCAI), Vol 14, No. 2, 1995 (hereinafter, "KOHAVI") discloses a technology in which a standard model that has learned all of an n count of training data, and a reference model that has learned an n−1 count of training data, in which a count of one of target data has been subtracted from the n count of training data, are each subjected to comparison of prediction error with regard to particular test data, thereby evaluation the degree of influence of the target data on the prediction accuracy of the standard model. According to this technology, reference models are learned, with each of all training data being the target data, and the prediction error is compared, thereby enabling evaluation of the degree of influence of prediction accuracy on the standard model, for all training data.

Pang Wei Koh and Percy Liang, "Understanding Blackbox Predictions via Influence Functions", International Conference on Machine Learning (ICML), 2017 (hereinafter "KOH et al.") discloses a technology for approximatively evaluating the degree of influence on each training data as to particular test data on prediction accuracy by a deep learning model, on the basis of characteristics of the deep learning model, which is a type of a machine learning model.

Japanese Patent Application Publication No. 2020-30738 discloses a technology for analyzing the degree of influence that each of training data has on prediction accuracy by a deep learning model, calculated regarding a plurality of counts of test data using the technology described in KOH et al., thereby identifying harmful data that would deteriorate the prediction accuracy of the deep learning model.

The technology described in KOHAVI is capable of being applied to any machine learning model, but there is a problem in that processing time thereof becomes great in proportion to the count of training data, since there is a need to perform machine learning processing to generate a reference model for each training data.

The technology described in KOH et al. evaluates the influence of training data on prediction accuracy using characteristics of a deep learning model, and accordingly, there is a problem in that an applicable machine learning model is limited to deep learning models. In particular, there is a problem of inapplicability to a decision tree type machine learning model, which is an effective machine learning model with regard to inference problems that handle structured data.

The technology described in Japanese Patent Application Publication No. 2020-30738 uses the degree of influence evaluated by the technology described in KOH et al., and accordingly applicable machine learning models are limited, in the same way as with the technology described in KOH et al. Note that using the degree of influence evaluated by the technology described in KOHAVI instead of the degree of influence evaluated by the technology described in KOH et al. enables versatility to be improved, but there is the problem in that the processing time becomes great as the count of training data increases in this case, in the same way as with the technology described in KOHAVI.

It is an object of the present disclosure to provide a computer system and a data analysis method that are capable of evaluating the degree of influence of training data on prediction accuracy of a decision tree type machine learning model, while suppressing increase in processing time thereof.

SUMMARY

A computer system according to an aspect of the present disclosure is a computer system for evaluating each of training data included in a training dataset used for learning by a trained model having a tree structure according to a decision tree. The computer system includes: a similarity score calculating unit configured to calculate, for each of the training data, a similarity score in which is evaluated a similarity between the training data in the trained model and other training data, using the tree structure; and an evaluating unit configured to select target data that is the training data that is a target of evaluation from the training dataset on the basis of the similarity score, and calculates an influence score in which a degree of influence of the target data on accuracy of the trained model is evaluated.

According to the present invention, the degree of influence of each of the training data on accuracy of a trained model can be evaluated, while suppressing increase in processing time for a decision tree type machine learning model.

BRIEF DESCRIPTION OF THE DRAWINGS

FIG. 3 is a diagram showing an example of a training dataset;

FIG. 4 is a diagram showing an example of a test dataset;

FIG. 5 is a diagram showing an example of similarity score data;

FIG. 6 is a diagram showing an example of influence score data;

FIG. 10 is a diagram showing an example of prediction value data;

FIG. 13 is a flowchart for describing the example of similarity score processing;

FIG. 16 is a diagram showing an example of arrival leaf node data;

FIG. 17 is a diagram showing an example of arrival leaf node aggregation data;

FIG. 18 is a diagram for describing an example of influence score calculation processing;

FIG. 19 is a flowchart for describing the example of influence score calculation processing;

DETAILED DESCRIPTION OF THE EMBODIMENT

An embodiment of the present disclosure will be described below with reference to the figures.

Figure 1:
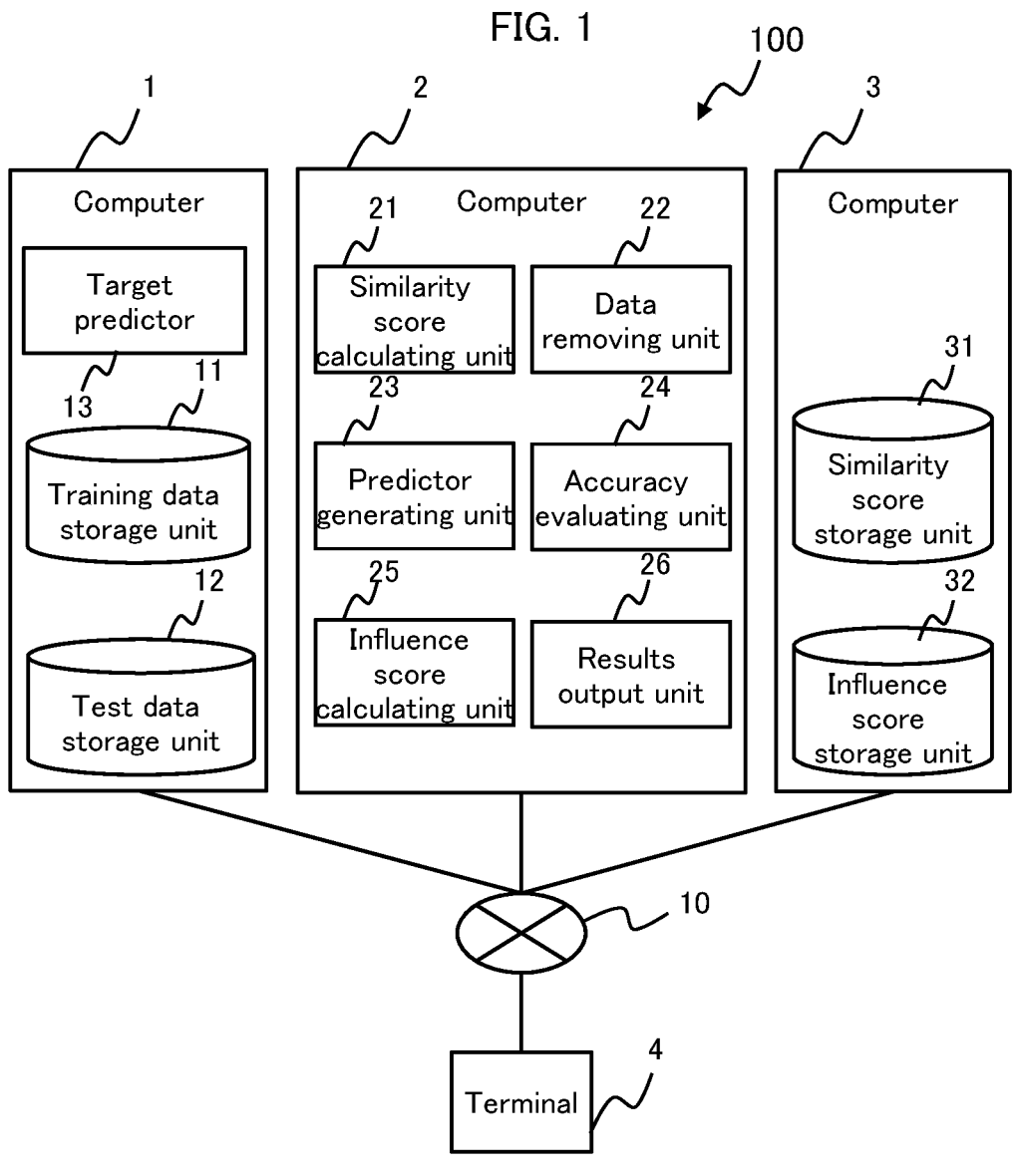
FIG. 1 is a configuration diagram illustrating a computer system according to an embodiment of the present disclosure.

FIG. 1 is a configuration diagram illustrating a computer system according to the embodiment of the present disclosure. The computer system 100 illustrated in FIG. 1 includes computers 1 to 3, with the computers 1 to 3 being communicably coupled to each other via a network 10. The computers 1 to 3 are also coupled to a terminal 4 via the network 10. The terminal 4 is a terminal apparatus that is operated by a user using the computer system 100. Note that the computer system 100 illustrated in FIG. 1 is only one example, and configurations may be made including one, two, or four or more computers.

The computer 1 is a computer that performs prediction of values relating to a desired event, using a trained model, which is a machine learning model that has been trained, and includes a training data storage unit 11, a test data storage unit 12, and a target predictor 13.

The training data storage unit 11 stores a training dataset that is a plurality of counts of training data used for training a trained model. The test data storage unit 12 stores a test dataset that is a plurality of counts of test data for evaluating the prediction accuracy of the trained model.

The target predictor 13 is a predictor that predicts values relating to the desired event, on the basis of input data, and is realized by a trained model by machine learning using training data stored in the training data storage unit 11. The trained model according to the present embodiment is a decision tree type machine learning model (a machine learning model that includes a tree structure according to a decision tree).

The computer 2 is a computer that evaluates the degree of influence of each of the training data stored in the training data storage unit 11 with respect to the prediction accuracy of the target predictor 13 of the computer 1 and includes a similarity score calculating unit 21, a data removing unit 22, a predictor generating unit 23, an accuracy evaluating unit 24, an influence score calculating unit 25, and a results output unit 26.

The similarity score calculating unit 21 calculates, with regard to each of the training data included in the training dataset stored in the training data storage unit 11 of the computer 1, a similarity score that is a value of evaluation of similarity between that training data and another training data, and outputs the similarity score for each of the training data as similarity score data. Note that the lower the similarity is, the higher this means the rarity of the training data in comparison with other training data, and thus it can be said that the similarity score is a value evaluating the rarity of the training data in the training dataset.

The data removing unit 22, the predictor generating unit 23, the accuracy evaluating unit 24, and the influence score calculating unit 25 make up an evaluating unit that selects target data from the training dataset stored in the training data storage unit 11, on the basis of the similarity score calculated by the similarity score calculating unit 21, and calculates an influence score that is an evaluation of the degree of influence of that training data on the accuracy of the target predictor 13.

The data removing unit 22 selects target data from the training dataset, on the basis of the similarity score, and generates a temporary training dataset obtained by removing the target data from the training dataset, for each of the target data. The target data is training data that is the target of evaluation for calculating the influence score, for example, and is training data of which the similarity score is equal to or smaller than a threshold value, for example.

The predictor generating unit 23 is a generating unit that, for each temporary training dataset generated by the data removing unit 22, generates a temporary predictor by a temporary trained model that has learned the temporary training dataset using a learning algorithm that has generated the target predictor 13.

The accuracy evaluating unit 24 generates and outputs, on the basis of each of the test data included in the test dataset stored in the test data storage unit 12, evaluation results in which the prediction accuracy of the target predictor 13 and each temporary predictor is evaluated. Specifically, for each of the test data, the accuracy evaluating unit 24 compares prediction results of the target predictor 13 with regard to an objective variables variable of the test data with an objective variable of the test data, evaluates the prediction accuracy of the target predictor 13, and outputs target predictor accuracy evaluation results which are evaluation results thereof. In the same way, for each of the test data, the accuracy evaluating unit 24 compares prediction results of each temporary predictor with regard to an objective variables variable of the test data with an objective variable of the test data, for each of the test data, evaluates the prediction accuracy of each temporary predictor, and outputs temporary predictor accuracy evaluation results which are the evaluation results thereof.

The influence score calculating unit 25 calculates, for each of the target data, an influence score in which the degree of influence of this target data on the accuracy of the target predictor 13 is evaluated, on the basis of the evaluation results output from the accuracy evaluating unit 24. Specifically, for each temporary predictor, the influence score calculating unit 25 calculates comparison results in which the target predictor accuracy evaluation results and the temporary predictor accuracy evaluation results, which are the evaluation results, are compared, as the influence score of the target data excluded in the temporary training dataset used for generating the temporary predictor. The influence score calculating unit 25 then outputs the influence score for each target data as influence score data.

The results output unit 26 outputs data based on the influence score data to the terminal 4, as analysis results data indicating the analysis results by the computer system 100.

The computer 3 is a third computer that stores data calculated at the computer 2, and includes a similarity score storage unit 31 and an influence score storage unit 32.

The similarity score storage unit 31 stores the similarity score data output from the similarity score calculating unit 21 of the computer 2. The influence score storage unit 32 stores the influence score data output from the influence score calculating unit 25 of the computer 2.

Figure 2:
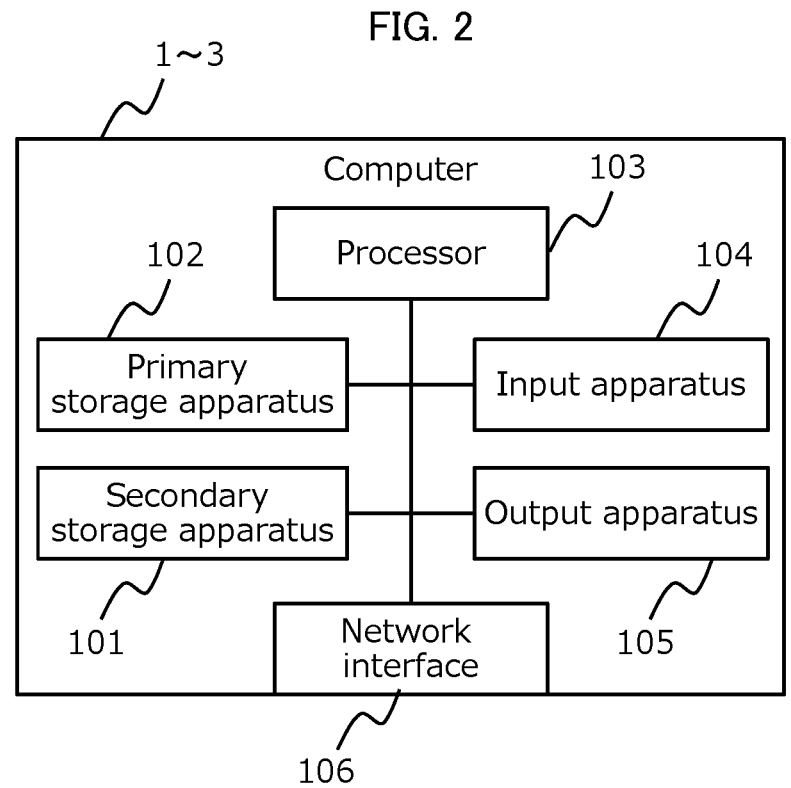
FIG. 2 is a diagram illustrating a hardware configuration of a computer.

FIG. 2 is a diagram illustrating a hardware confirmation of the computers 1 to 3. As illustrated in FIG. 2, the computers 1 to 3 include a secondary storage apparatus 101, a primary storage apparatus 102, a processor 103, an input apparatus 104, an output apparatus 105, and a network interface 106.

The secondary storage apparatus 101 is an apparatus that stores various types of data, and for example stores programs (computer programs) that define operations of the processor 103, and data used by or generated by the processor 103 or another computer. The training data storage unit 11, the test data storage unit 12, the similarity score storage unit 31, and the influence score storage unit 32, in FIG. 1, are realized in the secondary storage apparatus 101, for example. The primary storage apparatus 102 is a memory that functions as a work area for processing of programs.

The processor 103 reads programs stored in the secondary storage apparatus 101 into the primary storage apparatus 102, and executes processing in accordance with the programs, using the primary storage apparatus 102. The units 13 and 21 to 26 of the computers 1 and 2 illustrated in FIG. 1 are realized by the processor 103.

The input apparatus 104 is an apparatus by which various types of information are input by an operator or the like of a computer system, and the input information is used for processing by the processor 103. The output apparatus 105 is an apparatus that outputs (e.g., displays) various types of information. The network interface 106 is a communication apparatus that communicably couples to external apparatuses such as other computers, the terminal 4, and so forth, and exchanges data with the external apparatuses.

FIG. 3 is a diagram showing an example of a training dataset stored in the training data storage unit 11. In the example in FIG. 3, the training dataset is stored in the training data storage unit 11 as a training dataset 300 that has a table structure, and each record in the training dataset 300 corresponds to individual training data.

The training dataset 300 includes fields 301 to 303. The field 301 stores a training ID that is identification information identifying training data. The field 302 stores explanatory variables of the training data. In a case in which there is a plurality of explanatory variables, a field 302 is provided for each explanatory variable, and the fields 302 each store explanatory variables that are different from each other. The field 303 stores objective variables of the training data.

In the present embodiment, the training data is data relating to concrete, explanatory variables of each of the training data are variables that influence strength of concrete (e.g., the amount of water, the amount of cement, the number of days elapsed since the concrete was mixed, and so forth), and the objective variable is the strength of the concrete.

FIG. 4 is a diagram showing an example of a test dataset stored in the test data storage unit 12. In the example in FIG. 4, the test dataset is stored in the test data storage unit 12 as a test dataset 400 that has a table structure, and each record in the test dataset 400 corresponds to individual test data.

The test dataset 400 includes fields 401 to 403. The field 401 stores a test ID that is identification information identifying test data. The field 402 stores explanatory variables of the test data. In a case in which there is a plurality of explanatory variables, a field 402 is provided for each explanatory variable, and each of the fields 402 stores explanatory variables that are different from each other. The field 403 stores objective variables of the test data. Note that the test data is data of the same type as the training data, and is data relating to the strength of concrete in the present embodiment.

FIG. 5 is a diagram showing an example of similarity score data stored in the similarity score storage unit 31 in FIG. 1. Similarity score data 500 shown in FIG. 5 includes fields 501 and 502. The field 501 stores the training ID. The field 502 stores the similarity score of the training data identified by the training ID. Note that a detailed method of calculating the similarity score will be described later.

FIG. 6 is a diagram showing an example of influence score data stored in the influence score storage unit 32 in FIG. 1. Influence score data 600 shown in FIG. 6 includes fields 601 and 602. The field 601 stores the training ID of target data. The field 602 stores influence scores of target data identified by the training ID. Note that a detailed method of calculating influence scores will be described later.

Figure 7:
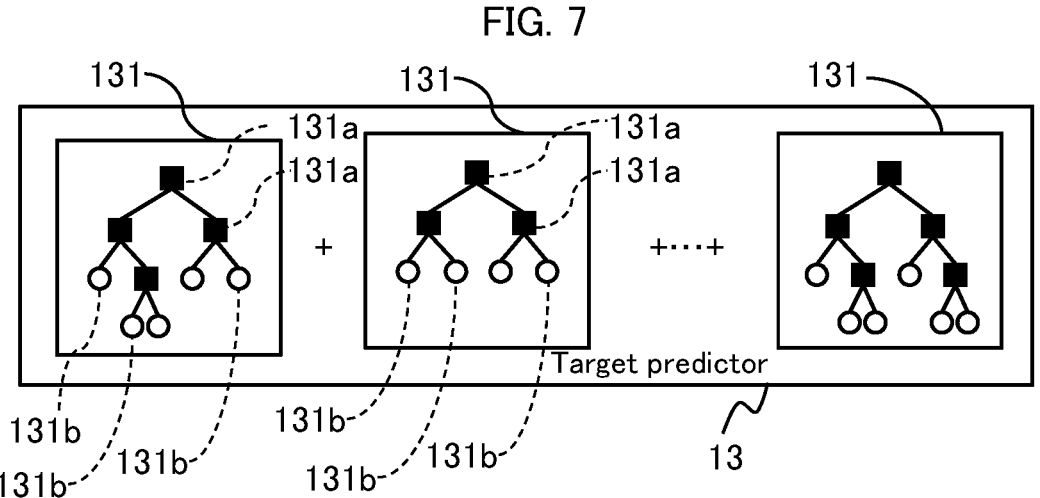
FIG. 7 is a diagram illustrating an internal configuration of a target predictor.

FIG. 7 is a diagram illustrating an internal configuration of the target predictor 13. The target predictor 13 illustrated in FIG. 7 is a predictor realized by an ensemble tree model, which is a type of a decision tree type machine learning model.

The target predictor 13 in FIG. 7 has a plurality of decision trees 131 that predict values regarding a desired event on the basis of input data, with the prediction value of the target predictor 13 being calculated on the basis of prediction values predicted at each decision tree 131. Hereinafter, prediction values predicted at the decision trees 131 will be referred to as "individual prediction values", and prediction values predicted at the target predictor 13 will be referred to simply as "prediction values". Prediction values are, for example, statistical values (e.g., mode, mean, etc.) of individual prediction values of each of the decision trees 131. The count of the decision trees 131 is not limited in particular.

Each decision tree 131 includes a plurality of nodes 131a, and each node 131a is linked by determination conditions with respect to an explanatory variable. Of the nodes 131a of the decision tree 131, nodes that have no link destination are referred to as leaf nodes 131b and are correlated with a value relating to the desired event. Accordingly, values corresponding to leaf nodes 131b that have been arrived at by the determination conditions of the nodes 131a of the decision tree 131 are individual prediction values.

Note that the node configuration of each decision tree 131 differs from each other. Also, each decision tree 131 is imparted a decision tree ID for identifying the decision tree, and each leaf node 131b is imparted with a leaf node ID for identifying the leaf node. The leaf node IDs are set uniquely within each decision tree 131. That is to say, even if the values of leaf node IDs are the same, different leaf nodes 131b are indicated if the leaf nodes belong to different decision trees 131.

Figure 8:
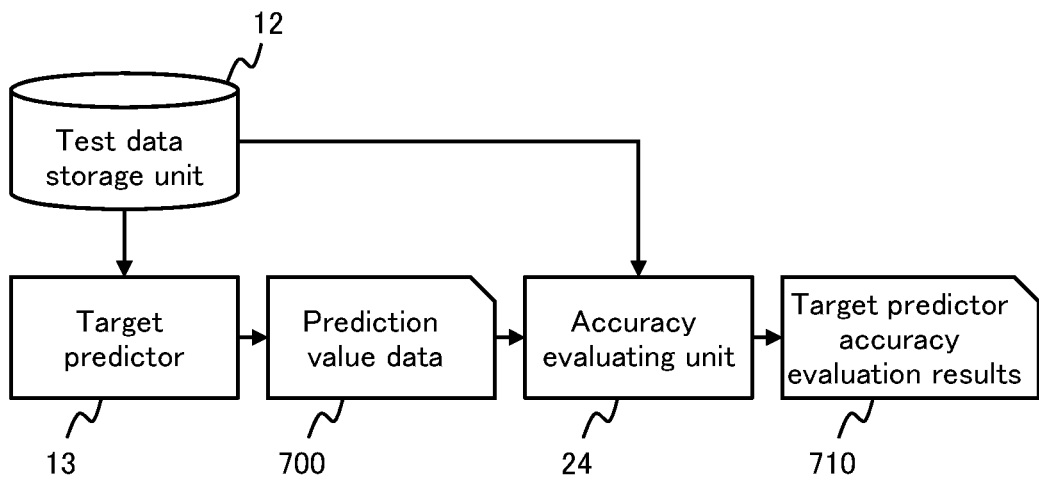
FIG. 8 is a diagram for describing an example of target predictor accuracy evaluation processing.
Figure 9:
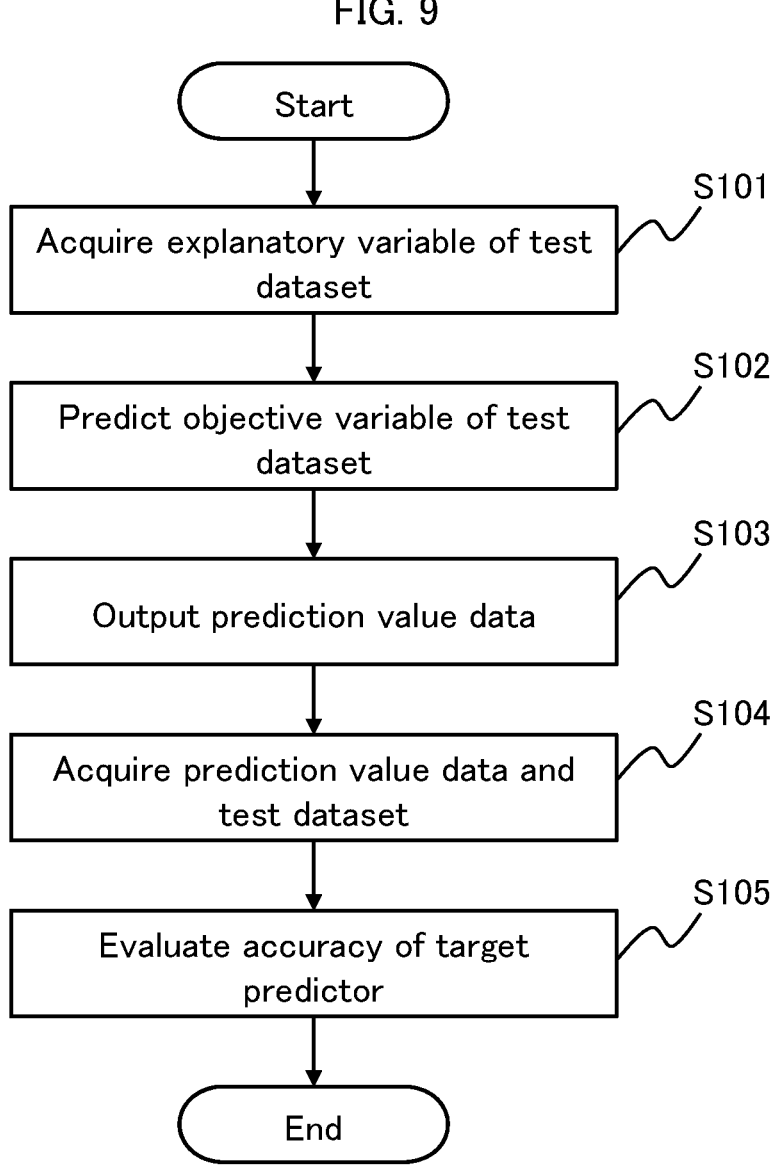
FIG. 9 is a flowchart for describing the example of target predictor accuracy evaluation processing.

FIG. 8 is a diagram for describing an example of target predictor accuracy evaluation processing for evaluating the accuracy of the target predictor 13. FIG. 9 is a flowchart for describing an example of the target predictor accuracy evaluation processing.

In the target predictor accuracy evaluation processing, the target predictor 13 first acquires, from the test data storage unit 12, an explanatory variable of test data for each of the test data (step S101).

The target predictor 13 calculates, for each of the test data, a prediction value in which a value of the objective variable has been predicted from the explanatory variable of the test data (step S102). The target predictor 13 outputs the prediction value for each of the test data as prediction value data 700 (step S103).

Thereafter, the accuracy evaluating unit 24 acquires the prediction value data 700 output from the target predictor 13, and also acquires a test dataset from the test data storage unit 12 (step S104).

The accuracy evaluating unit 24 evaluates the prediction accuracy of the target predictor 13 on the basis of the prediction value data 700 and each of the test data in the test dataset which are acquired, and outputs the evaluation results thereof as target predictor accuracy evaluation results 710 (step S105), and ends the target predictor accuracy evaluation processing. Prediction accuracy is, for example, statistical values such as a difference between an actual value and a predicted value regarding an objective variable in each of the test data, or the like. Examples of statistical values include mean error, root-mean-square error, and so forth.

FIG. 10 is a diagram showing an example of the prediction value data 700. The prediction value data 700 shown in FIG. 10 include fields 701 and 702. The field 701 stores the test ID. The field 702 stores a prediction value of an objective variable of the test data identified by the test ID.

Figure 11:
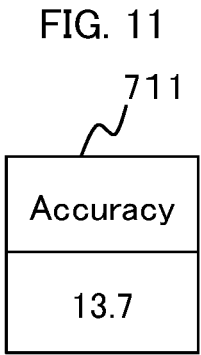
FIG. 11 is a diagram showing an example of target predictor accuracy evaluation results.

FIG. 11 is a diagram showing an example of the target predictor accuracy evaluation results 710. The target predictor accuracy evaluation results 710 shown in FIG. 11 include a field 711. The field 711 stores accuracy, which is the prediction accuracy of the target predictor 13.

Figure 12:
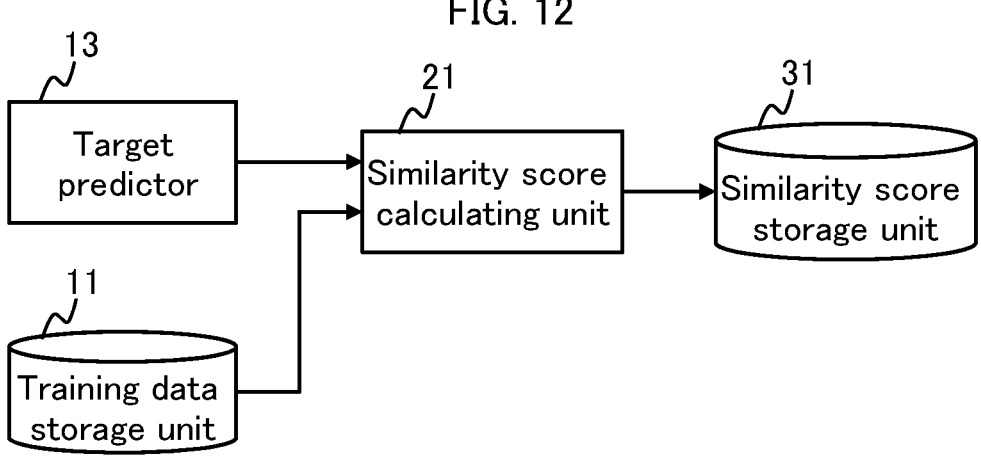
FIG. 12 is a diagram for describing an example of similarity score processing.

FIG. 12 is a diagram for describing an example of similarity score processing for generating similarity score data. FIG. 13 is a flowchart for describing an example of the similarity score processing.

In similarity score processing, first, the similarity score calculating unit 21 acquires a trained model that realizes the target predictor 13, and a training dataset stored in the training data storage unit 11 (step S201).

The similarity score calculating unit 21 executes similarity score calculation processing (see FIGS. 14 and 15) for calculating a similarity score for each of the training data included in the training dataset, on the basis of the trained model and the training dataset that are acquired (step S202).

The similarity score calculating unit 21 stores a similarity score for each of the training data in the similarity score storage unit 31 as similarity score data (step S203), and ends the similarity score processing.

Figure 14:
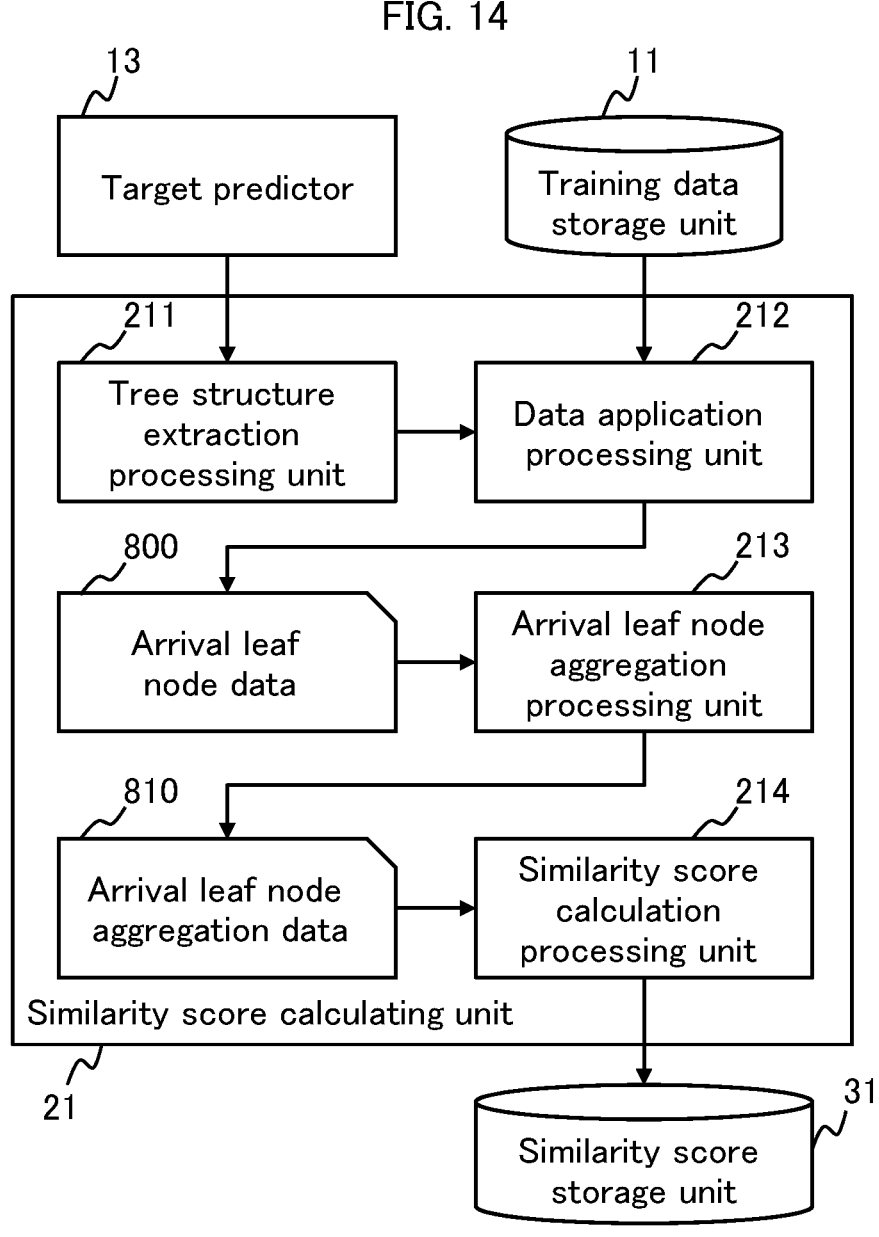
FIG. 14 is a diagram for describing an example of similarity score calculation processing.
Figure 15:
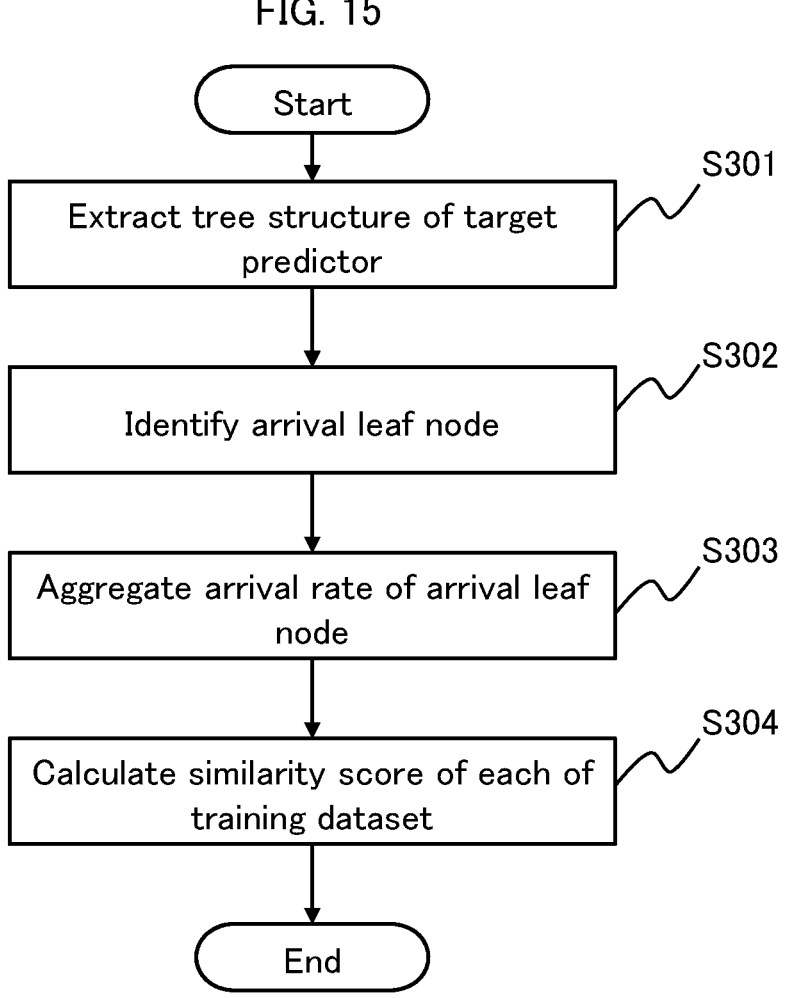
FIG. 15 is a flowchart for describing the example of similarity score calculation processing.

FIG. 14 is a diagram for describing an example of the similarity score calculation processing in step S202 in FIG. 13, and FIG. 15 is a flowchart for describing an example of similarity score calculation processing. As illustrated in FIG. 14, the similarity score calculating unit 21 includes a tree structure extraction processing unit 211, a data application processing unit 212, an arrival leaf node aggregation processing unit 213, and a similarity score calculation processing unit 214.

In the similarity score calculation processing, first, the tree structure extraction processing unit 211 of the similarity score calculating unit 21 extracts, from the trained model of the target predictor 13, a tree structure of this trained model (step S301). The tree structure specifically indicates nodes in each decision tree 131 included in the trained model, links among the nodes, and so forth.

With regard to each of the training data included in the training dataset, the data application processing unit 212 identifies, for each decision tree 131 included in the trained model, an arrival leaf node that is the leaf nodes 131b where the training data arrives when the training data is input to the decision tree 131, on the basis of the tree structure extracted by the tree structure extraction processing unit 211. The data application processing unit 212 outputs the leaf node ID that identifies the arrival leaf node for each decision tree 131 of each of the training data, as arrival leaf node data 800 (step S302).

For each of the training data, the arrival leaf node aggregation processing unit 213 aggregates, for each arrival leaf node of each decision tree 131 to which the training data has arrived, an arrival rate that is a proportion of training data arriving at this arrival leaf node out of training data included in the training dataset, on the basis of the arrival leaf node data 800. The arrival leaf node aggregation processing unit 213 outputs the aggregated data as arrival leaf node aggregation data 810 (step S303).

The similarity score calculation processing unit 214 calculates and outputs, for each of the training data, a similarity score evaluating the degree of similarity of this training data as to other training data, on the basis of the arrival leaf node aggregation data 810 (step S304), and ends the similarity score calculation processing. The similarity score is, for example, a statistical value of arrival rate for each arrival leaf node. Examples of similarity score include mean, median, and so forth. Note that the arrival leaf node aggregation processing unit 213 and the similarity score calculation processing unit 214 make up a calculation processing unit that calculates similarity scores of each of the training data on the basis of the arrival leaf node data 800.

FIG. 16 is a diagram showing an example of the arrival leaf node data 800. The arrival leaf node data 800 in FIG. 16 includes fields 801 and 802. The field 801 stores the training ID. The field 802 is provided for each decision tree 131, and stores the leaf node ID of the arrival leaf node in the corresponding decision tree 131 where the training data identified by the training ID has arrived.

FIG. 17 is a diagram showing an example of the arrival leaf node aggregation data 810. The arrival leaf node aggregation data 810 in FIG. 17 includes fields 811 and 812. The field 811 stores the training ID. The field 812 is provided for each decision tree 131, and stores the arrival rate of arrival of the training data identified by the training ID arriving at the arrival leaf node in the corresponding decision tree 131.

For example, the example in FIG. 17 indicates that 0.5% of all training data has arrived at the arrival leaf node (leaf node ID "Leaf 3", see FIG. 16) where training data of training ID "1" arrives in the decision tree 131 of decision tree ID "Tree 1". Note that in each decision tree 131, the arrival rate at the same arrival leaf node will all be the same value.

Figure 18:
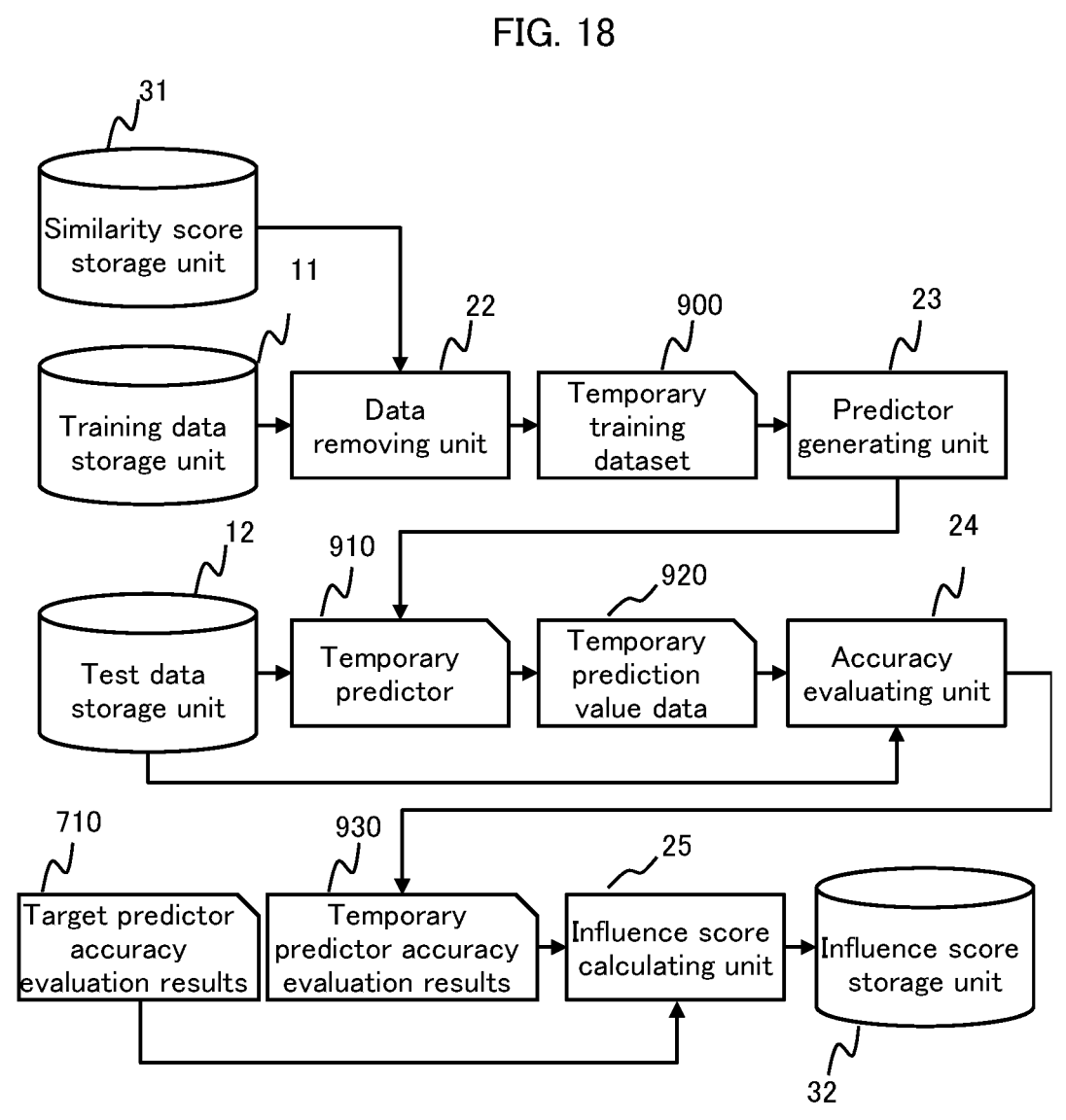

FIG. 18 is a diagram for describing an example of influence score calculation processing, in which an influence score is calculated, and FIG. 19 is a flowchart for describing an example of the influence score calculation processing.

In the influence score output processing, the data removing unit 22 first acquires a training dataset stored in the training data storage unit 11, and similarity score data stored in the similarity score storage unit 31. The data removing unit 22 takes training data that is the i'th lowest in similarity score as target data, and generates and outputs a temporary training dataset 900 which is the training dataset from which the target data is removed (step S401). Here, i is a counter value of counting target data, and the initial value thereof is 1.

The predictor generating unit 23 uses the learning algorithm that has generated the trained model of the target predictor 13 to generate a temporary predictor 910 that is a temporary trained model that has learned the temporary training dataset 900 generated in step S401 (step S402).

The temporary predictor 910 acquires a test dataset from the test data storage unit 12, calculates a prediction value with the explanatory variable of each of the test data in the test dataset as input, and outputs the prediction value regarding each of the test data as temporary prediction value data 920 (step S403).

The accuracy evaluating unit 24 acquires the temporary prediction value data 920 and the test dataset from the temporary predictor 910, evaluates the prediction accuracy of the temporary predictor 910 on the basis of the temporary prediction value data 920 and each of the test data in the test dataset, which are acquired, and outputs the evaluation results thereof as temporary predictor accuracy evaluation results 930 (step S404). The temporary predictor accuracy evaluation results 930 indicates statistical values of the difference between an actual value and a predicted value regarding an objective variable in each of the test data, for example, as prediction accuracy, in the same way as with the target predictor accuracy evaluation results 710.

The influence score calculating unit 25 acquires the target predictor accuracy evaluation results 710 output in the target predictor accuracy evaluation processing (see FIGS. 8 and 9) and the temporary predictor accuracy evaluation results 930, calculates comparison results of comparison thereof as influence score of the target data excluded from the temporary training data used for generating the temporary training model, and stores the influence score in the influence score storage unit 32 (step S405). The influence score is the difference between the target predictor accuracy evaluation results 710 and the temporary predictor accuracy evaluation results 930, for example.

The influence score calculating unit 25 judges whether ending conditions, for ending the influence score calculation processing, are satisfied or not (step S406). The ending conditions are that i, which is the count of temporary training data created, is equal to or higher than a threshold value, or the like. The threshold value may be set by a user or operator, for example, or may be determined in advance.

In a case in which the ending conditions are not satisfied (No in step S406), the influence score calculating unit 25 increments i (step S407), and returns to the processing of step S401. Conversely, in a case in which the ending conditions are satisfied (Yes in step S406), the influence score calculation processing ends.

Figure 20:
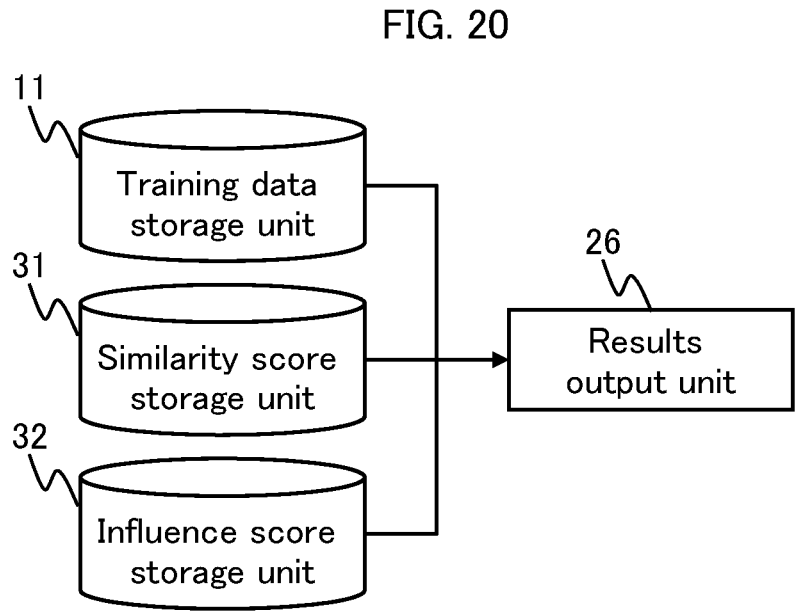
FIG. 20 is a diagram for describing an example of results output processing.
Figure 21:
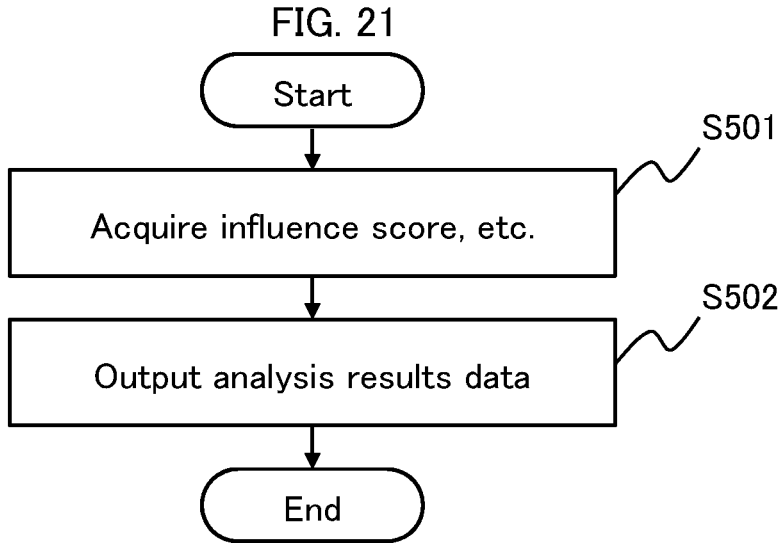
FIG. 21 is a flowchart for describing the example of results output processing.

FIG. 20 is a diagram for describing an example of results output processing for outputting the influence score, and FIG. 21 is a flowchart for describing an example of the results output processing.

In the results output processing, first, the results output unit 26 acquires training data stored in the training data storage unit 11, similarity score data stored in the similarity score storage unit 31, and influence scores stored in the influence score storage unit 32 (step S501).

The results output unit 26 generates analysis results data in which the various types of data acquired in step S501 are combined, with the teaching ID as a key, displays an analysis screen showing the analysis results data on the terminal 4 (step S502), and ends the results output processing.

The results output unit 26 may extract target data regarding which the influence score indicates deterioration in the accuracy of the trained model, and include this target data in the analysis results data as harmful data. For example, a case will be assumed in which the prediction accuracy of the trained model is the root-mean-square error of the actual values and the prediction values of the objective variable in each of the test data, and the influence score of each of the target data is a value obtained by subtracting the target predictor accuracy evaluation results 710 from the temporary predictor accuracy evaluation results 930. In this case, a negative influence score means that the prediction accuracy improved by removing the target data, so the results output unit 26 extracts this target data as harmful data that deteriorates the accuracy regarding the trained model of the target predictor 13.

Figure 22:
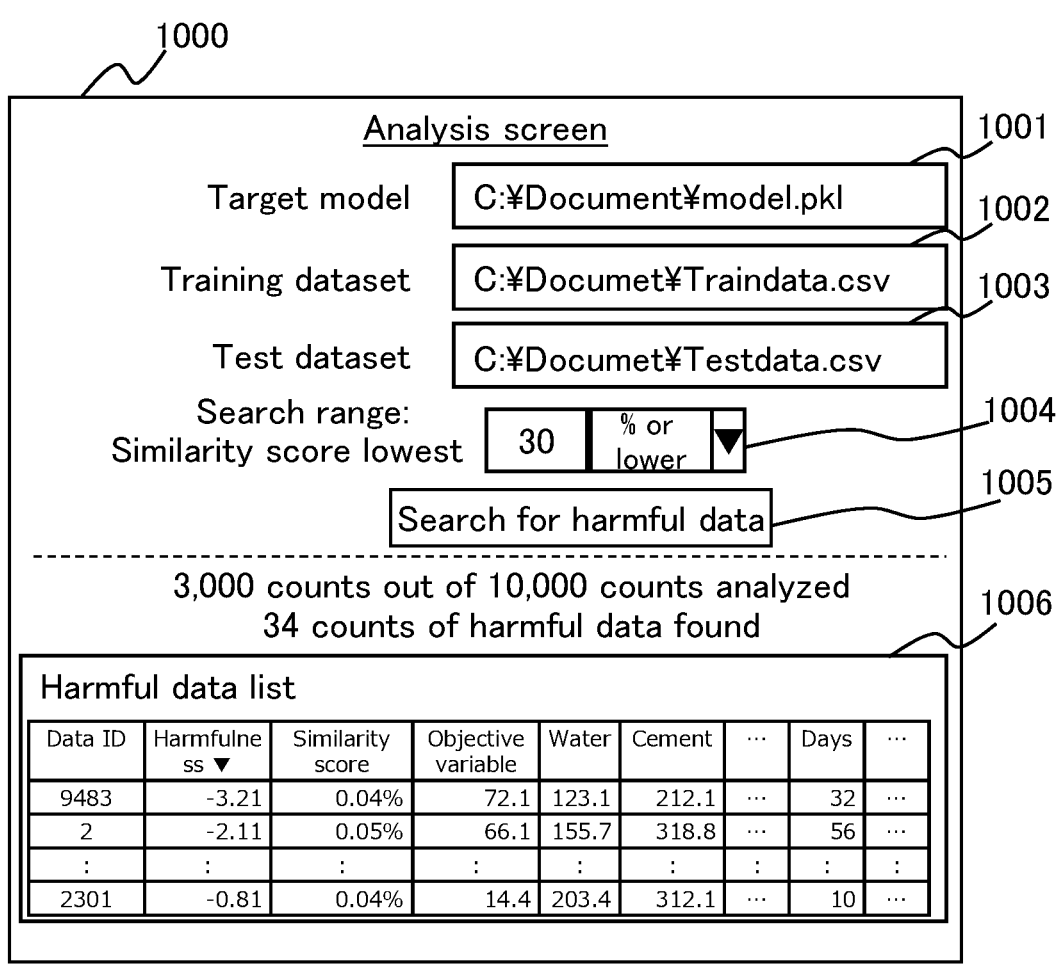
FIG. 22 is a diagram illustrating an example of an analysis screen.

FIG. 22 is a diagram illustrating an example of an analysis screen. An analysis screen 1000 illustrated in FIG. 22 is a screen displayed on the terminal 4 and has input boxes 1001 to 1004, an execution button 1005, and a display area 1006.

The input box 1001 is a box for specifying a target model that is a trained model making up the target predictor 13. The input box 1002 is a box for specifying training data. The input box 1003 is a box for specifying test data. The input box 1004 is a box for specifying a search rage. The search range is a range of similarity scores for specifying training data to be selected as target data, and specifying is performed from the lower end of similarity scores of training data, as a proportion therefrom, a count therefrom, or the like.

The execution button 1005 is a button for executing the evaluation of the training data, and when pressed, processing by the computer system 100 is started. The display area 1006 is an area for displaying analysis results data, and displays a list of harmful data in the example in FIG. 22.

As described above, according to the present embodiment, the similarity score calculating unit 21 uses the tree structure of the trained model of the target predictor 13 to calculate, for each of the training data used for learning this trained model, a similarity score in which is evaluated the similarity between this training data in the trained model and other training data. The evaluating units (22 to 25) select target data that is the training data that is the target of evaluation from the training dataset on the basis of the similarity score, and calculate an influence score in which the degree of influence of this target data on accuracy of the trained model is evaluated. Accordingly, training data of which the similarity score is high and accordingly is thought to be unlikely to influence accuracy of the trained model due to not being rare can be excluded, and the degree of influence on the accuracy of the training model can be evaluated regarding only training data of which the possibility of deteriorating the accuracy of the training mode is high. Thus, the degree of influence of training data can be evaluated while suppressing increase in processing time.

Also, according to the present embodiment, a similarity score is calculated for each decision tree included in the trained model, on the basis of an arrival leaf node that is a leaf node where this training data arrives when this training data is input to this decision tree. Accordingly, the similarity score corresponding to the learning content of the trained model can be calculated more appropriately, and thus the similarity regarding the trained model can be evaluated more precisely.

Also, according to the present embodiment, the similarity score is calculated on the basis of aggregation data aggregating with regard to each of the training data, for each arrival leaf node of each decision tree, an arrival rate that is a proportion of training data arriving at this arrival leaf node out of training data included in the training dataset. In particular, a statistical value of arrival rate for each arrival leaf node is calculated as the similarity score, for each of the training data. Accordingly, the similarity score corresponding to the learning content of the trained model can be calculated more appropriately, and thus the similarity regarding the trained model can be evaluated more precisely.

Also, according to the present embodiment, the influence score is calculated on the basis of evaluation results of evaluating the accuracy of the trained model of the target predictor 13, and evaluation results of evaluating the accuracy of a temporary trained model that has learned the temporary training dataset from which the target data has been removed. Accordingly, the influence score of the target data can be evaluated more precisely.

Also, according to the present embodiment, comparison results in which evaluation results data of the trained model and evaluation results of the temporary trained model are compared, are calculated as the influence score of target data excluded from the temporary training dataset used to generate the temporary trained model. Accordingly, the degree of influence of training data can be evaluated more precisely.

Also, according to the present embodiment, target data regarding which the influence score indicates deterioration in accuracy of the trained model is extracted, and accordingly training data that is harmful to the trained model can be easily identified.

Also, according to the present embodiment, training data of which the similarity score is equal to or smaller than a threshold value is selected as the target data. Accordingly, the target data can be appropriately selected.

The above-described embodiment of the present disclosure is an exemplification for describing the present disclosure, and is not intended to limit the scope of the present disclosure to the embodiment alone. One skilled in the art will be able to carry out the present disclosure in various other forms without departing from the scope of the present disclosure.

What is claimed is:

1. A computer system for evaluating each of training data included in a training dataset used for learning by a trained model having a tree structure using a decision tree, the computer system comprising:

a processor coupled to a memory storing instructions for the processor to function as:

a similarity score calculating unit configured to calculate, for each of the training data, a similarity score in which is evaluated a similarity between the training data in the trained model and other training data, using the tree structure; and a similarity score calculating unit configured to calculate, for each of the training data, a similarity score in which is evaluated a similarity between the training data and other training data in the training dataset, using the tree structure of the trained model, wherein the similarity score calculating unit is configured to calculate the similarity score by identifying, for each decision tree in the trained model, arrival leaf nodes where the training data arrives when the training data is input to the decision tree, and calculating arrival rates representing proportions of training data arriving at each arrival leaf node out of training data included in the training dataset, and calculating the similarity score based on the arrival rates; and an evaluating unit configured to select target data that is the training data that is a target of evaluation from the training dataset on a basis of the similarity score, and calculate an influence score in which a degree of influence of the target data on accuracy of the trained model is evaluated, wherein the computer system is configured to improve computational efficiency of machine learning model evaluation, by reducing processing time required for influence analysis through similarity score-based pre-filtering of training data, to avoid computationally expensive retraining operations on full training dataset.

2. The computer system according to claim 1, wherein the similarity score calculating unit includes:

a data application processing unit configured to identify, for each decision tree included in the trained model, an arrival leaf node that is a leaf node where the training data arrives when the training data is input to this decision tree, for each of the training data, and a calculation processing unit configured to calculate the similarity score on a basis of the arrival leaf node.

3. The computer system according to claim 2, wherein the calculation processing unit includes:

an aggregation processing unit configured to generate aggregation data aggregating with regard to each of the training data, and for each arrival leaf node of each decision tree, an arrival rate that is a proportion of training data arriving at the arrival leaf node out of training data included in the training dataset, and a similarity score calculation processing unit configured to calculate the similarity score on a basis of the aggregation data.

4. The computer system according to claim 3, wherein the similarity score calculation processing unit is configured to calculate a statistical value of the arrival rate for each arrival leaf node as the similarity score, for each of the training data.

5. The computer system according to claim 1, wherein the evaluating unit includes:

a data removing unit configured to, on the basis of the similarity score, select the target data, and generate a temporary training dataset that is obtained by removing each individual target data from the training dataset, one target data at a time, a generating unit configured to use a learning algorithm that generated the trained model, thereby generating a separate temporary trained model for each temporary training dataset, an accuracy evaluating unit configured to generate, on a basis of test data, evaluation results in which accuracy of the trained model and each temporary trained model is evaluated, and an influence score calculating unit configured to calculate the influence score on a basis of the evaluation results.

6. The computer system according to claim 5, wherein the influence score calculating unit is configured to calculate, for each of the temporary trained models, comparison results in which evaluation results data of the trained model and evaluation results of the temporary trained model are compared, as the influence score of target data excluded from the temporary training dataset used to generate the temporary trained model.

7. The computer system according to claim 1, further comprising a results output unit configured to extract and output, from among the target data, target data regarding which the influence score indicates deterioration in accuracy of the trained model.

8. The computer system according to claim 1, wherein the evaluating unit takes the training data of which the similarity score is equal to or smaller than a threshold value as the target data.

9. A data analysis method carried out by a computer system that evaluates each of training data included in a training dataset used for learning by a trained model having a tree structure using a decision tree, with the computer system including a processor and a storage apparatus storing the training dataset, the data analysis method comprising by using the processor:

acquiring the training dataset from the storage apparatus;

calculating, for each of the training data, a similarity score in which is evaluated a similarity between the training data and other training data, in the training dataset, using the tree structure of the trained model, wherein the calculating includes identifying, for each decision tree in the trained model, arrival leaf nodes where the training data arrives when the training data is input to the decision tree, and calculating arrival rates representing proportions of training data arriving at each arrival leaf node out of training data included in the training dataset, and calculating the similarity score based on the arrival rates; and selecting target data that is the training data that is a target of evaluation from the training dataset on a basis of the similarity score, and calculating an influence score in which a degree of influence of the target data on accuracy of the trained model is evaluated, wherein the data analysis method causes the computer system to improve computational efficiency of machine learning model evaluation, by reducing processing time required for influence analysis through similarity score-based pre-filtering of training data, to avoid computationally expensive retraining operations on full training dataset.

10. The computer system according to claim 1, wherein the similarity score calculating unit is further configured to calculate the similarity score by determining, for each of the training data, a statistical value of the arrival rates across all decision trees in the trained model, wherein the statistical value comprises at least one of a mean, median, or standard deviation of the arrival rates.

11. The computer system according to claim 1, wherein the evaluating unit is configured to select the target data by applying a threshold-based filtering process that identifies training data having similarity scores below a predetermined percentile of all similarity scores in the training dataset, and wherein the influence score calculating unit calculates the influence score by measuring a change in prediction accuracy between the trained model and each temporary trained model using a root-mean-square error metric.

12. The computer system according to claim 1, wherein the similarity score calculating unit includes a tree structure extraction processing unit configured to extract structural information from each decision tree in the trained model, including node connectivity and decision conditions at each internal node, and wherein the arrival rates are calculated by tracking a path traversal of each training data through the extracted tree structure to determine final leaf node destinations.

13. The computer system according to claim 1, wherein the similarity score calculating unit and evaluating unit are implemented as specialized hardware components of the processor including at least one of a graphics processing unit (GPU) or tensor processing unit (TPU) configured to perform parallel processing of tree structure traversal and similarity score calculations across multiple training data simultaneously.

14. The computer system according to claim 1, wherein the trained model comprises an ensemble of decision trees, and wherein the computer system is configured to automatically optimize hyperparameters of the trained model, based on the calculated influence scores by identifying and removing training data that negatively impact model performance, to improve prediction accuracy of the trained model for new input data.

\* \* \* \* \*